Feb. 28, 1939.  R. BOCHY  2,148,925
METHOD OF REPOINTING A WORN EXCAVATOR TOOTH
Filed Nov. 25, 1936
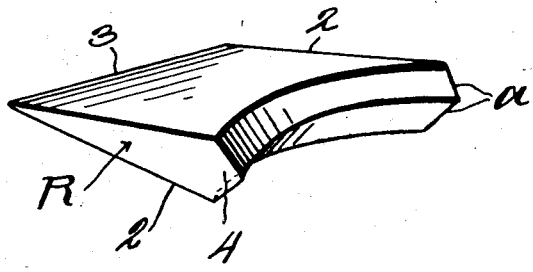
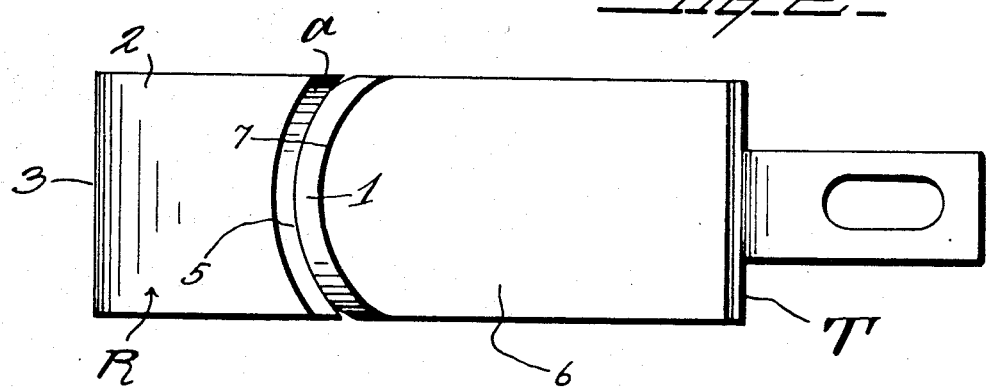
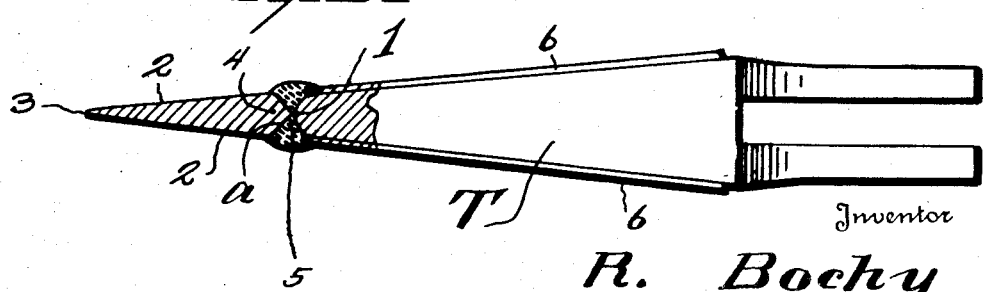
Inventor
R. Bochy
By Watson E. Coleman
Attorney Patented Feb. 28, 1939

2,148,925

UNITED STATES PATENT OFFICE 2,148,925

METHOD OF REPOINTING A WORN EXCAVATOR TOOTH

Richard Bochy, Floyd Hill, Colo.

Application November 25, 1936, Serial No. 112,805

1 Claim. (Cl. 76—101)

This invention relates to a method of repointing a worn excavator tooth, and it is an object of the invention to provide a method of this kind whereby a worn tooth may be repointed in a manner to assure saving both in time and labor with the advantageous result of materially prolonging the life of the tooth.

The novel features of my invention will hereinafter be definitely claimed.

In order that my invention may be the better understood, I will now proceed to describe the same with reference to the accompanying drawing, wherein:

Figure 1 is a view in perspective of a repoint constructed in accordance with an embodiment of my invention;

Figure 2 is a view in top plan of the repoint as herein embodied initially applied or fitted to a tooth;

Figure 3 is a view partly in side elevation and partly in section of the assembly as illustrated in Figure 2 and further showing the weld connection between the repoint and the tooth.

As illustrated in the accompanying drawing, T denotes a tooth of a type generally employed in connection with excavator buckets or the like. The forward or point portion of this tooth T after a short period of use wears away leaving a transversely curved or rounded outer edge, as indicated at 1. After this tooth T has worn rearwardly a certain distance it is necessary that the tooth either be repointed or discarded in place of an entirely new tooth.

In the accompanying drawing I show associated with the forward or worn extremity of the tooth T a repoint R. This repoint is of desired metal and is of a width substantially equal to the width of the tooth T to which it is to be applied. This repoint R also has the upper and bottom faces 2 resulting in a forward straight penetrating edge 3 and with a materially thick rear end face 4. This end face 4 is recessed on an inward curvature extending entirely across the repoint R and of a radius to snugly receive the outer rounded worn end portion of the tooth T. This rear face 4 is oppositely and inwardly beveled, as at a, from substantially the transverse center of the rear face 4, resulting in grooves 5 defining the junction of the applied repoint R and the forward worn end of the tooth T so that the repoint R can be fastened in place by welding.

By having the curved rear face of the repoint R conforming to the forward worn end of the tooth T the desired welding can be accomplished with considerably less material than would be required should the rear face of the repoint be straight thereacross. This particular formation of the repoint R also assures a strong connection of the repoint in working position whereby the life of the tooth T is materially prolonged.

After a tooth has been repointed several times it becomes weak with a resultant possibility of the tooth breaking. Therefore, I find it of importance and advantage to provide means for strengthening the tooth proper and, as herein disclosed, I provide the strengthening plates 6 welded to the opposite faces of the tooth T. These applied plates compensate for the wear upon the rear portion of the tooth T and further assure the life of the tooth.

As is illustrated in Figure 2 of the drawing, it is to be noted that the worn edge 1 of the tooth and the beveled edge 4 constitute complementary concavo convex ends.

From the foregoing description it is thought to be obvious that a repoint constructed in accordance with my invention is particularly well adapted for use by reason of the convenience and facility with which it may be assembled and used, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

The herein-described method of repointing a worn excavator tooth having an outer transversely rounded worn edge consisting of applying to the worn edge of the tooth a repoint with an oppositely beveled edge confronting the worn edge of the tooth proper, and having said beveled edge on a transverse curve complementary to the worn edge of the tooth, welding to the side faces of the tooth proper strengthening plates, and then welding in the grooves formed on the opposite faces of the repoint and tooth proper at the confronting complementary concavo convex edges of the tooth proper and repoint.

RICHARD BOCHY.